G. FINDLAY & J. HANSEN.
FILE HOLDER.
APPLICATION FILED JULY 5, 1912.
1,094,549.
Patented Apr. 28, 1914.
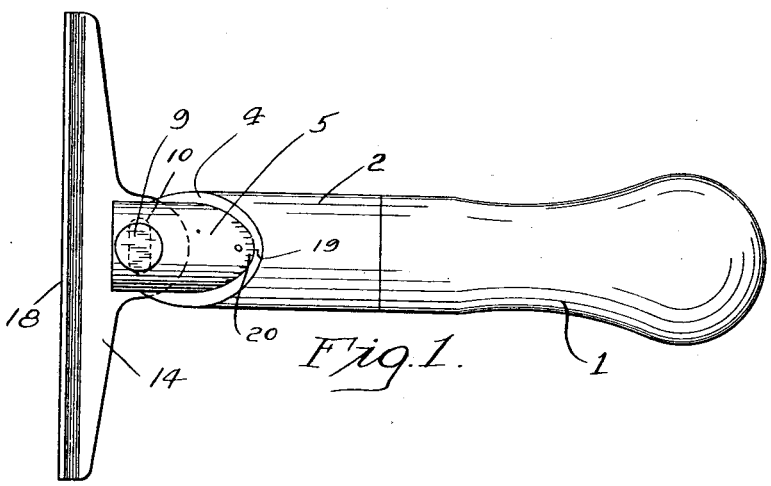
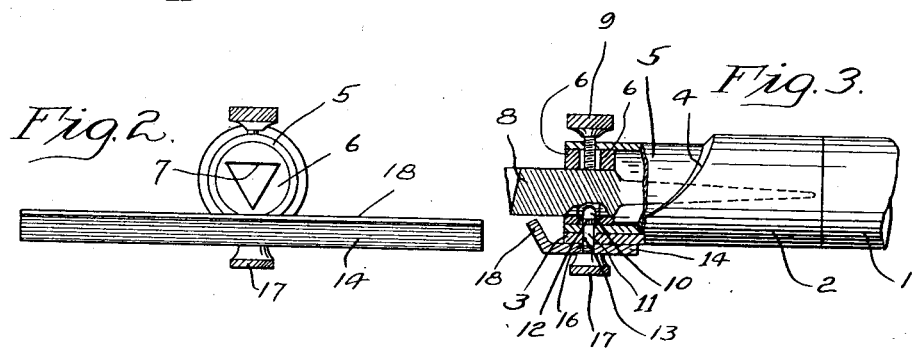
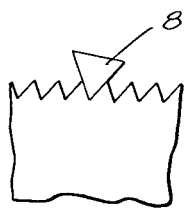
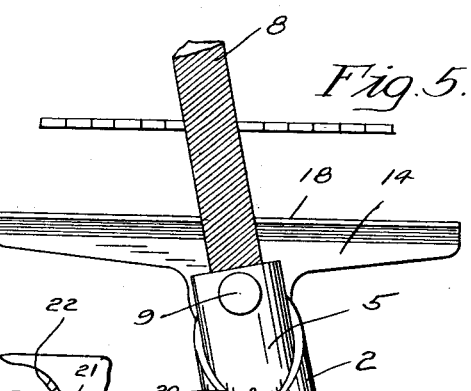
WITNESSES:
H. A. Stock.
M. M. Escherich
INVENTORS
Gilbert Findlay
Joseph Hansen
BY
Harry C. Schroeder
ATTORNEY

UNITED STATES PATENT OFFICE.

GILBERT FINDLAY, OF BERKELEY, CALIFORNIA, AND JOSEPH HANSEN, OF BELLINGHAM, WASHINGTON.

FILE-HOLDER.

1,094,549.      Specification of Letters Patent.      Patented Apr. 28, 1914.

Application filed July 5, 1912. Serial No. 707,883.

*To all whom it may concern:*

Be it known that we, GILBERT FINDLAY and JOSEPH HANSEN, citizens of the United States, residing at Berkeley, county of Alameda, State of California, and Bellingham, in the county of Whatcom and State of Washington, respectively, have invented certain new and useful Improvements in File-Holders, of which the following is a specification.

Our present invention relates to new and useful improvements in tool holders and more particularly to that class adapted for such tools as a file, which have a reciprocatory movement manually imparted thereto in order to work the material.

The principal objects of our invention are to embody in the tube of the holder guide means whereby the mechanic may operate the tool at a predetermined angle or angles with respect to the work, such tool holder being adapted to position the tool at any practical angle as may be desired.

The invention is disclosed in the accompanying drawing, forming a part of this specification, as holding a triangular shaped file for sharpening saws, and its particular advantage when so used is made apparent from the fact that few men, except experts, can file a saw uniformly as to the pitch, etc., when using an ordinary file without guide means therefor. The guide means provided for in the device embodying our invention enables the operator to guide the file at a predetermined angle with respect to both longitudinal and transverse planes of the saw.

In the drawing: Figure 1 is a top plan view of the tool holder embodying our invention. Fig. 2 is a front elevation of the same. Fig. 3 is a fragmentary view partly in side elevation and partly in section to disclose details of construction. Fig. 4 is a view showing a fragmentary portion of a saw and the positioning of the file with respect thereto to obtain the desired hook to the saw tooth. Fig. 5 is a fragmentary view in top plan showing the application of our device for filing saws. Fig. 6 is a fragmentary bottom plan view of a portion of the device embodying our invention.

Similar characters refer to similar parts throughout the views.

A handle 1 is provided with a ferrule 2, which has a forwardly extending portion 3 preferably formed by cutting the ferrule transversely at an angle as indicated at 4. Revolubly carried by the ferrule 2 is a cylindrical shell 5 which stands into the ferrule and has secured to its inner periphery two keying disks 6 spaced apart from each other and each having a key aperture 7, in the example shown, triangular in shape, to receive the end of a tool 8,— a file of similar shape. The shell 5 carries a set screw 9 which passes between the said disks 6 to engage and rigidly retain the tool in fixed relation to the shell 5, and preferably diametrically opposite set screw 9 the shell is provided with a circumferentially extending slot 10. This slot 10 accommodates a screw 11 the head 12 lying between the said disks fixed against the inner periphery of the shell 5 and the screw extending through an aperture 13 in the extending portion 3 of the ferrule 2. A guide means 14 is provided with an aperture 16 through which said screw 11 passes and the end of said screw receives a thumb nut 17 to rigidly clamp said elements together, as will be subsequently disclosed. The guide piece 14 has an upturned edge 18 and in operation is held substantially parallel with the axis of the several teeth of the saw. The ferrule 2 is provided with an indicator mark 19 while the shell 5 is graduated as at 20, or the indicator mark and graduation may be transposed if desired. Similarly, the ferrule 2 has an indicator mark 21 adjacent the guide 14, which latter has graduations 22.

The operation of the device is as follows: By loosening nut 17, shell 5 may be rotated to position the working faces of the file 8 at a predetermined angle to the plane of guide 14 and which is determinable according to the amount of hook to the saw tooth, it is desired to provide, as clearly shown in Fig. 4 of the drawing. In other words, determines the angle of the tooth with respect to the transverse plane of the saw. The guide piece 14 is then set according to the indicator mark and graduations according to the angle of the face of the tooth with respect to the longitudinal plane of the saw, and the nut 17 is turned tightly which draws head 12 against the shell 5 and the several elements 5, 2 and 14, are securely held in a set position. As the operator manually reciprocates the device, in filing, he keeps the guide portion 18 everywhere substantially parallel to the longitudinal axis of the several saw teeth, or to some predetermined axis of whatever object the tool is to work upon.

We claim:—

1. A manually operable tool holder comprising in combination, a handle, a ferrule carried thereby and having an extending portion provided with an aperture, a cylindrical shell revolubly carried by and projecting from said ferrule and having a circumferentially extending slot adapted to be alined with the said aperture, means carried by said shell for gripping the tool, a screw having its head in engagement with the inner periphery of said shell and passing through the said slot therein and through said aperture in said ferrule, and a nut for said screw.

2. A manually operable tool holder comprising in combination, a handle, a ferrule carried thereby and having an extending portion provided with an aperture, a cylindrical shell revolubly carried by and projecting from said ferrule and having a circumferentially extending slot adapted to be alined with the said aperture, means carried by said shell for gripping the tool, a guide having an aperture formed therein, a screw having its head in engagement with the inner periphery of said shell and passing through the said slot therein, through the said aperture in said ferrule, and through the said aperture in the said guide, and a nut for said screw.

In testimony whereof we affix our signatures in presence of two witnesses.

GILBERT FINDLAY.
JOSEPH HANSEN.

Witnesses as to the signature of Gilbert Findlay:
W. A. STOCK,
M. M. ESCHERISH.

Witnesses as to the signature of Joseph Hansen:
U. A. EMPEY,
J. E. MOORE.

Copies of this patent may be obtained for five cents each, by addressing the "Commissioner of Patents, Washington, D. C."